United States Patent Office 2,707,714
Patented May 3, 1955

2,707,714

PROPARGYL SULFIDES AND MERCAPTANS AND PROCESS FOR PREPARING SAME

George W. Conklin, Oakland, and Rupert C. Morris, Berkeley, Calif., assignors to Shell Development Company, New York, N. Y., a corporation of Delaware No Drawing. Application November 23, 1953, Serial No. 393,920

14 Claims. (Cl. 260—609)

This invention relates to novel organic acetylenically unsaturated sulfur-containing compounds and to a novel method for their preparation.

The compounds of the present invention are new and useful organic sulfur-containing compounds having directly attached to a divalent sulfur atom at least one beta, gamma-acetylenically unsaturated organic radical, which radical is hereinafter referred to as a propargyl radical. Preferably, the present compounds contain only one propargyl radical. Thus, there are provided by the present invention propargyl sulfides and propargyl mercaptans. It is preferred that the present compounds contain only carbon, hydrogen, and sulfur atoms.

The propargyl sulfides and mercaptans of the present invention are those which satisfy the following general structural formula:

$$RC \equiv C-C(R)_2-S-R''$$

wherein R, R' and R" are each a hydrogen atom or an organic radical, preferably an aliphatic hydrocarbyl radical.

According to a more specific embodiment of the invention, R and R' are each the hydrogen atom or a lower alkyl group, preferably of not more than 5 carbon atoms, and R" is hydrogen or a lower alkyl group, preferably of not more than 5 carbon atoms.

Representative typical propargyl sulfides and mercaptans of the present invention include the following: propargyl mercaptan; alpha, alpha-dimethylpropargyl mercaptan; alpha-methylpropargyl mercaptan; 2-butyne thiol; 2-pentyne thiol; alpha-ethylpropargyl mercaptan; dipropargyl sulfide; alpha-alpha'-dimethyldipropargyl sulfide; alpha,alpha,alpha',alpha'-tetramethyldipropargyl sulfide; isopropyl propargyl sulfide; methyl propargyl sulfide; ethyl propargyl sulfide; butyl propargyl sulfide; amyl propargyl sulfide; tertiary-butyl propargyl sulfide; isobutyl propargyl sulfide; bis(2-butynyl)sulfide; isopropyl 2-butynyl sulfide; ethyl 2-butynyl sulfide; isobutyl 2-butynyl sulfide; bis(2-pentynyl) sulfide; methyl 2-pentynyl sulfide; 3,3-dimethyl-4-thia-1-pentyne; 3-methyl-4-thia-1-pentyne; 3,3-diethyl-4-thia-1-pentyne; 3-isopropyl-4-thia-1-pentyne; 3,3 - dimethyl - 4 - thia - 1 - hexyne; 3,3,5 - trimethyl - 4 - thia - 1 - hexyne; 3,3 - diethyl - 4 -thia - 1 - hexyne; 3-isopropyl - 4 thia - 1 - hexyne; 3 - methyl - 4 - thia - 1-hexyne; 3,5 - dimethyl - 4 - thia - 1 - hexyne; 3,3 - methyl-4 - thia-1-heptyne; 3,3,5 - trimethyl - 4 - thia - 1 - heptyne; 3 - methyl - 3 - ethyl - 4 - thia - 1 - heptyne; 3,3,5,5-tetramethyl - 4 - thia-1-hexyne; 4,4-dimethyl-5-thia-2-heptyne; 4,6 - dimethyl - 5 - thia - 2 - heptyne; 4,6-diisopropyl-5-thia-2-heptyne; 4,4-dimethyl-5-thia-2-octyne; 4,4,6,6-tetramethyl - 5 - thia - 2 - heptyne; 4,4-diethyl-5-thia-2-octyne; 3,3 - diamyl - 4 - thia - 1 - octyne; 3,3-dimethyl - 4 - thia-5-ethyl - 1 - octyne; 3-ethyl-4-thia-5-methyl-1-octyne; 3-methyl - 3 - ethyl-4-thia-1-pentyne; 3,3-diisobutyl-4-thia-1-pentyne; 3,3 - diisobutyl - 4 - thia-5-methyl-1-hexyne; 3,3-diisopropyl - 4 - thia - 1 - hexyne; 3,3-diisopropyl-4-thia-5,5 - dimethyl - 1 - hexyne; 3-methyl-3-isobutyl-4-thia-5-methyl - 1 - hexyne; 3-methyl-3-isobutyl-4-thia-5-methyl-1 - heptyne; 3,3 - diethyl - 4 - thia-1-nonyne; 5,5-dimethyl-6 - thia - 3-heptyne; 5,5,-diethyl-6-thia-7-methyl-3-octyne; 5,5-diisobutyl-6-thia-3-decyne; and the like.

It has been found that the novel propargyl sulfides and mercaptans can be prepared by reacting a terminally acetylenically unsaturated compound with a carbonyl compound, that is, an aldehyde or ketone, and a compound containing the —SH radical, that is, hydrogen sulfide or an organic mercaptan. The acetylenic compound is preferably an acetlyenic hydrocarbon. The reaction can be illustrated by the following equation:

$$RC \equiv CH + (R')_2CO + HSR'' \rightarrow RC \equiv C-C(R')_2-S-R'' + H_2O$$

wherein R, R' and R" have the same meanings as above. Preferably R is hydrogen. The above method is particularly suitable for the preparation of propargyl sulfides in which case R" is an organic radical, preferably an aliphatic hydrocarbyl radical. The exact mechanism of the reaction is not known, but it is believed that the carbonyl compound reacts with the mercaptan or hydrogen sulfide to form the corresponding mercaptal or dithiol, respectively, which in turn reacts with the acetylenic compound to form the propargyl compounds of the present invention.

The process for the preparation of the present compounds by the above reaction can be carried out by mixing the reactants with a suitable catalyst and, preferably, subjecting the mixture to heat and pressure. Where a gaseous material, such as acetylene, constitutes one of the reactants, the remaining reactants can be mixed with a suitable catalyst and charged to a closed vessel such as an autoclave. Gaseous acetylene can then be introduced into the mixture.

Suitable catalysts which can be employed are copper and its salts, as for example, copper chloride or cuprous chloride, copper acetate, copper formate or acetylene-copper compounds. The reaction is preferably carried out in a basic or weakly acid medium. The process can be carried out in the presence or absence of solvents, as for example, water or organic solvents miscible with water, such as alcohols, dioxane or low molecular weight fatty acids. The temperature of the process depends upon the reactants employed. Generally, the temperature varies between about 50° C. and about 200° C. The reaction can be carried out at atmospheric pressure or at increased pressures of up to about 1000 p. s. i.

The propargyl mercaptans of the present invention can also be prepared by reacting a propargyl halide with an alkali metal hydrosulfide, preferably in alcoholic solution, in accordance with the following equation;

$$RC \equiv C-C(R')_2-X+MSH \rightarrow RC \equiv C-C(R')_2-SH+MX$$

wherein R and R' have the same meanings as above, X is a halogen atom, and M is an alkali metal. The corresponding symmetrical sulfides can also be obtained by the same reaction. Generally, the reaction product contains a mixture of the mercaptan and the corresponding symmetrical sulfide.

Symmetrical propargyl sulfides can also be prepared by reacting a propargyl halide with an alkali metal sulfide at an elevated temperature. Asymmetrical propargyl sulfides can be prepared by reacting a propargyl halide with an organic mercaptan in accordance with the following equation:

$$RC \equiv C-C(R')_2-X+HSR'' \rightarrow RC \equiv C-C(R')_2-S-R''+HX$$

wherein R, R', R" and X have the same meanings as given above. Instead of the organic mercaptan, the corresponding alkali metal organic mercaptide can be used in the above equation.

The invention is illustrated by the following examples which are not to be considered as limiting the specification or claims in any manner:

*Example I.—Propargyl mercaptan and dipropargyl sulfide*

323 parts by weight (2.71 moles) of propargyl bromide were added slowly to 801 parts by weight of a methanol solution containing 3.39 moles of sodium hydrosulfide which was stirred at 20° C. External cooling was necessary. The mixture was stirred for 20 minutes longer. The reaction mixture was shaken with 340 parts by weight of ice in a 25% NaCl solution. One part by volume of water was added to break the emulsion. The upper oily layer, 160 parts by weight, was separated and then dried over sodium sulfate. The dried oil was then fractionated, under reduced pressure, yielding 11 parts by weight of cold trap material (propargyl mercaptan) and 30 parts by weight of a fraction boiling between 36.2° and 36.8° C. at 3.4 mm. Hg pressure (dipropargyl sulfide).

*Example II.—3,3,5-trimethyl-4-thia-1-hexyne*

One part by weight of sodium hydroxide was partially dissolved in 11 parts by weight of ethanol. 145 parts by weight (2.5 moles) of acetone, 211 parts by weight (2.78 moles) of isopropyl mercaptan and 5 parts by weight of cuprous chloride were then added whereupon the sodium hydroxide substantially completely dissolved. The mixture was charged to an autoclave. The charged autoclave was flushed with nitrogen and then pressured to 100 p. s. i. g. with nitrogen and finally to a total of 220 p. s. i. g. at 23° C. with 1.23 moles of acetylene which was added with intermittent stirring. The reaction was effected at 130° to 140° C. The autoclave was then drained. The withdrawn material was filtered and distilled to separate a fraction boiling from 45° C. at 95 mm. Hg pressure to 65° C. at 20 mm. Hg pressure, which fraction was 3,3,5-trimethyl-4-thia-1-hexyne.

*Example III.—Isopropyl propargyl sulfide*

50 parts by weight (0.658 moles) of isopropyl mercaptan and 250 parts by volume of benzene were placed in a vessel which was attached to a reflux condenser and refluxed. Eight parts by weight (0.348 moles) of sodium were added in portions, and the reaction mixture was refluxed at 70° C. to 78° C. until all of the sodium had dissolved. 47 parts by weight (0.399 mole) of propargyl bromide was then added slowly to the refluxing solution. The reaction mixture was washed twice with water to remove the resulting salt. The non-aqueous phase was distilled to obtain, as product, a fraction boiling between 73° to 80.5° C., head temperature. The product was a water-white liquid having a boiling point of 78–80° C. at 100 mm. Hg pressure, a specific gravity (20/4) of 0.9251 and a refractive index (n20/D) of 1.4795. Analysis.—Found, carbon—62.28%, hydrogen—8.74%, sulfur—27.7%; Calculated, carbon—63.1%, hydrogen—8.76%, and sulfur—28.05%.

*Example IV.—3,3-dimethyl-4-thia-1-hexyne*

148 parts by weight (0.902) moles of 2,2-bis(ethylmercapto) propane, 10 parts by weight of potassium hydroxide pellets and 5 parts by weight of cuprous chloride were charged to an autoclave. The autoclave was flushed with nitrogen, then pressured to 100 p. s. i. g. with nitrogen and then alternately pressured with 1.4 to 1.5 moles of acetylene which was added with stirring. The reaction mass was drained from the autoclave and filtered. The filtrate was fractionated to obtain, as product, 3,3-dimethyl-4-thia-1-hexyne.

*Example V.—2-butynyl ethyl sulfide*

Sodium ethyl mercaptide was reacted with 2-butynyl bromide in the presence of benzene. The reaction mixture was washed to remove the resulting salt. The non-aqueous phase was distilled to obtain, as product, 2-butynyl ethyl sulfide.

The compounds of the present invention are useful as insecticides, fungicides, and like agricultural aids; as additives for lubricating oils and greases; and as raw materials or intermediates for use in the synthesis of a variety of chemical products. Because of their acetylenic linkage, the present compounds are particularly reactive and can be subjected to polymerization either directly or after conversion of the acetylenic linkage to an ethylenic linkage, thereby obtaining resinous materials. The compounds of the present invention which contain only one propargyl radical, specifically, propargyl mercaptans and alkyl propargyl sulfides, are particularly useful for the preparation of thermoplastic resinous materials.

We claim as our invention:

1. Propargyl mercaptan.
2. Dipropargyl sulfide.
3. 3,3,5-trimethyl-4-thia-1-hexyne.
4. Isopropyl propargyl sulfide.
5. 3,3-dimethyl-4-thia-1-hexyne.
6. An alkyl propargyl sulfide having a single sulfur atom per molecule in which the alkyl group contains not more than 5 carbon atoms.
7. An alkynyl propargyl sulfide having a single sulfur atom per molecule in which the alkynyl group contains not more than 5 carbon atoms.
8. An aliphatic propargyl sulfide containing only carbon and hydrogen atoms and one sulfur atom per molecule.
9. A propargyl mercaptan containing only carbon and hydrogen atoms and one sulfur atom per molecule.
10. An organic compound having a single sulfur atom per molecule, said sulfur atom being divalent, and having directly attached to said divalent sulfur atom at least one propargyl radical.
11. A method for preparing 3,3,5-trimethyl-4-thia-1-hexyne which comprises reacting acetylene with acetone and isopropyl mercaptan in the presence of a copper salt catalyst.
12. A method for preparing a propargyl sulfide having a single sulfur atom per molecule which comprises reacting a terminally acetylenically unsaturated compound with a carbonyl compound and an organic mercaptan in the presence of a copper catalyst.
13. The method according to claim 12, wherein the terminally acetylenically unsaturated compound is a terminally acetylenically unsaturated hydrocarbon.
14. A method for preparing an organic compound having a single sulfur atom per molecule, said sulfur atom being divalent, and having directly attached to said divalent sulfur atom at least one propargyl radical which comprises reacting a terminally acetylenically unsaturated compound with a carbonyl compound and a compound containing the —SH radical.

References Cited in the file of this patent

UNITED STATES PATENTS

| | | |
|---|---|---|
| 2,229,665 | Mochel et al. | Jan. 29, 1941 |
| 2,412,814 | Kendall et al. | Dec. 17, 1946 |